United States Patent
Werner et al.

(10) Patent No.: US 6,351,721 B1
(45) Date of Patent: Feb. 26, 2002

(54) METHOD AND SYSTEM FOR TURBINE CLEARANCE MEASUREMENT ANALYSIS

(75) Inventors: Dennis J. Werner, Dallas, TX (US); Kevin J. Lord, Bolton, MA (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/337,653

(22) Filed: Jun. 22, 1999

(51) Int. Cl.[7] .............................................. G01B 11/22
(52) U.S. Cl. .................... 702/166; 60/39.02; 73/861.79; 324/207.25; 356/4.07; 384/117
(58) Field of Search .................................. 702/155, 158, 702/166, 182, FOR 113, FOR 123, FOR 124; 73/861.87; 364/431.01, 431.02; 415/17, 26

(56) References Cited

U.S. PATENT DOCUMENTS

| | | | |
|---|---|---|---|
| 4,357,104 A | * 11/1982 | Davinson | 356/4 |
| 4,501,095 A | * 2/1985 | Drinkuth et al. | 51/165.72 |
| 4,876,505 A | * 10/1989 | Osborne | 324/208 |
| 5,627,761 A | * 5/1997 | Pollard | 364/506 |
| 5,772,334 A | * 6/1998 | Parkin et al. | 384/117 |
| 5,866,824 A | * 2/1999 | Schieber | 73/861.79 |
| 6,155,038 A | * 12/2000 | Irwin et al. | 60/39.02 |

* cited by examiner

Primary Examiner—Arthur T. Grimley
Assistant Examiner—John Le
(74) Attorney, Agent, or Firm—Nixon & Vanderhye P. C.

(57) ABSTRACT

A system and method for analyzing part clearance data compares stored design clearance data and tolerance data with actual measured clearance values to determine whether any of the actual clearance values are out of tolerance. Clearance values are measured and input using a digital gauge or like apparatus. The data may be displayed in a spreadsheet along with the design clearance data, and any values that are out of tolerance that therefore require adjustment can be highlighted. Out of tolerance values can be corrected via a manual adjustment or a virtual adjustment.

14 Claims, 3 Drawing Sheets

METHOD AND SYSTEM FOR TURBINE CLEARANCE MEASUREMENT ANALYSIS

BACKGROUND OF THE INVENTION

This invention relates to equipment part clearance measurement analysis and, more particularly, to a computer software-based method and apparatus for analyzation of equipment clearance measurement data for positioning and optimizing an equipment part.

Using current methods, manual taper gauges are used to measure clearances for rotating equipment parts such as turbine parts (e.g., a turbine rotor or a turbine casing). The manual readings are input to a spreadsheet, and a comparison is made with design clearance values to determine whether any of the actual clearance values exceed preset tolerances. Because most turbine maintenance outages require between 400 to 3000 clearance readings, the analysis and processing of these readings have become a tedious process.

Moreover, after inputting and comparing each individual clearance, if one or more values are outside of tolerance, it is necessary to move one or more components and start the process again. This procedure involves hundreds of tedious time consuming calculations, taking hours to perform.

BRIEF SUMMARY OF THE INVENTION

According to the invention, the numerous calculations and data entries are eliminated using a digital gauge for clearance measurements in conjunction with analyzation software, resulting in reduced outage times, improved productivity, and increased accuracy.

In an exemplary embodiment of the invention, a method for analyzing clearance data is provided, including the steps of (a) storing design clearance data and tolerance data for a part, (b) measuring actual clearance values for the part, and (c) determining whether any of the actual clearance values are out of tolerance. If any actual clearance values are out of tolerance, the method includes (c1) indicating or highlighting actual clearance values that are out of tolerance, (c2) adjusting a position of the part, and (c3) repeating step (c). The method may be implemented using an electronically scanned design clearance drawing, wherein measuring is practiced by designating a measurement area on the design clearance drawing for a next measurement of actual clearance values. An identification number is preferably assigned to the next measurement that identifies a specific equipment location. The actual clearance values may be displayed on a spreadsheet, and actual clearance values that are out of tolerance can be highlighted on the spreadsheet. The step of adjusting the position of the part may include adjusting an axial position of the part, a radial position of the part, or both. The adjusting step may be virtual such that the system can calculate corresponding adjusted values. In order to effect the virtual adjustment, in the context of an adjusted axial position of the part, axial readings and radial readings must be distinguished so that only axial readings are adjusted. In this context, adjusting may be practiced by optimizing the axial position of the part, then adjusting a radial position of the part. Preferably, according to the invention, the part is one of a turbine rotor or a turbine casing.

In another exemplary embodiment according to the invention, an apparatus for analyzing equipment part clearance data is provided. The apparatus includes a memory storing design clearance data and tolerance data for the part. An electronic data recorder or like apparatus measures actual clearance values for the part, and a processor determines whether any of the actual clearance values are out of tolerance. If any actual clearance values are out of tolerance, the processor indicates or highlights actual clearance values that are out of tolerance. The processor may be enabled to effect a virtual adjustment of the part if any actual clearance values are out of tolerance.

DETAILED DESCRIPTION OF THE DRAWINGS

It is necessary to take precision clearance readings on rotating equipment such as pumps, compressors, turbines and the like. Clearances are critical between rotating parts and non-rotating parts. These parts are positioned at numerous locations within the rotating equipment, and each must be positioned within specified tolerances to maximize operation. Although the application of the system according to the present invention is described in conjunction with a turbine part, the invention is not meant to be limited.

Figure 1:
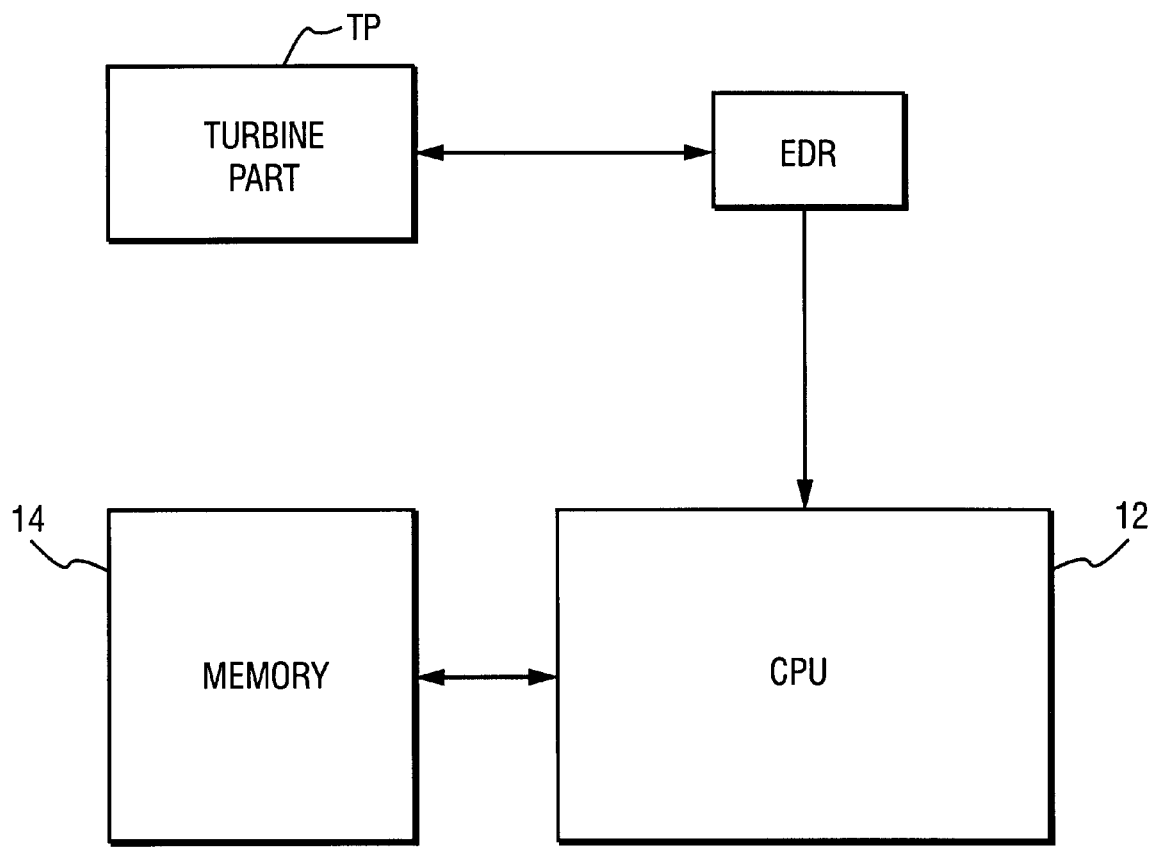
FIG. 1 is a block diagram illustrating the components of the invention.

FIG. 1 is a block diagram of the system components according to the present invention. A digital gauge such as an EDR available from Powerhouse Tools of Joliet, Ill. measures clearance data of a turbine part TP and uploads the data via a connection to a processing unit 12. Alternatively, a manual gauge may also be used, requiring manual entry of the data. One or more memory devices 14 stores the actual clearance values measured by the EDR and also stores design clearance data and tolerance data for each part of the equipment.

Figure 2:
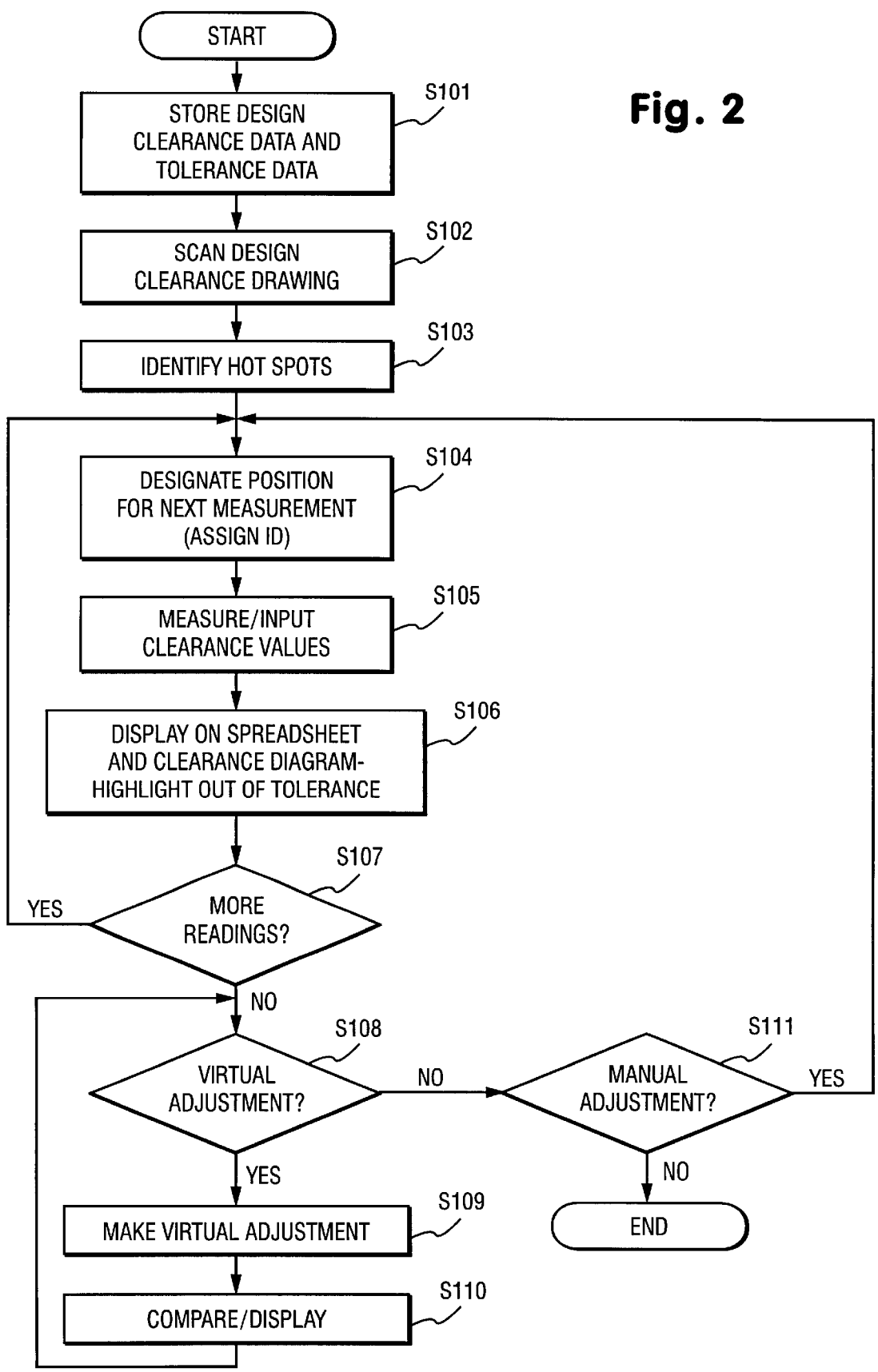
FIG. 2 is a flow chart illustrating a process according to the present invention.

FIG. 2 is a flow chart illustrating the measuring and analyzing process according to the invention. In preliminary steps S101 and S102, design clearance data and tolerance data are stored in the memory 14, and a clearance measurement drawing is electronically scanned for storage and display, respectively. The design clearance data and tolerance data are determined at the design level in accordance with established principles of equipment design. The manner in which design clearance data and tolerance data is determined does not form part of the present invention. In the scanning step S102, any suitable electronic image scanner may be used to capture the clearance measurement drawing for storage and display. This data is stored in a designated partition or area in the memory 14. Hot spots for clearance measurement are then identified in step S103 by the operator. The hot spots are preferably identified on the clearance measurement drawing in an order corresponding to a desired order for clearance measurements.

In step S104, the system designates a position in the turbine for a next measurement and assigns a unique identification number indicating the exact location of the measurement. That is, the identification number is selected by the system to indicate exactly which clearance measurement designation it is, the particular stage or location, the turbine section, which end of the turbine section, etc. For example, referring to FIG. 3, row 54 of the spreadsheet contains the identification number "LPA STAGE 12G." The designation "LPA" refers to the Low Pressure "A" hood (as opposed to the "B" hood) of the turbine. The turbine stages are typically numbered from front to back, and the designation "STAGE 12" refers to stage number 12. Additionally, the designation "G" refers to the generator end (as opposed to the turbine end). Still further, each stage requires about ten clearance readings, designated by letters, which may also be indicated in the identification number (such as by "CLEARANCE H"). The design clearance data and tolerance data is designated with corresponding identification numbers so that the system can readily compare actual clearance values with the design clearance data.

To facilitate the measurement, the system preferably indicates the designated position for the next measurement on the displayed clearance measurement drawing, e.g., with highlighting, a flashing cursor or the like. Alternatively, the next measurement position may be indicated by its description or identification number, and the scanned clearance measurement drawing need not necessarily be used. The system then knows that the next data input from the digital gauge EDR or entered manually corresponds to the designated measurement position.

In step S105, a measurement is taken using the digital gauge EDR or like manual apparatus, and the one or more clearance values associated with the designated measurement position is input. The measured or actual clearance value and its associated unique identification number are stored in the memory 14. The input data along with corresponding identification numbers are then displayed on a spreadsheet (see background in FIG. 3) and on the clearance measurement drawing (see centered foreground in FIG. 3) (step S106) together with the stored design clearance data and/or the tolerance data. As the data is input to the system, the system compares actual clearance values with corresponding design clearance data and determines whether any of the actual clearance values are out of tolerance. Any out of tolerance values are highlighted on the spreadsheet and/or the clearance measurement drawing.

In step S107, the system determines whether there are more readings to be taken, and if so, the process returns to step S104 for a next measurement position designation. If there are no more readings to be taken (NO in step S107), the system determines in step S108 whether a virtual adjustment is necessary or desired. As noted, with the conventional methodology, in order to properly position a turbine rotor or casing, it was necessary to continuously adjust and readjust the part while retaking measurements after each adjustment until all critical clearances were within tolerance. With the system according to the present invention, a virtual part adjustment can be made by the system, and clearance values can be automatically adjusted to reflect the virtual adjustment without requiring the operator to take additional readings. For example, axial measurements can be distinguished from radial measurements in the system, and a virtual axial adjustment can be accommodated with corresponding adjustments in all axial readings. Once the axial position of the part is optimized, after accordingly manually adjusting the part, the operator could then make radial adjustments to complete the positioning of the part. Of course, it is also contemplated that radial adjustments could also be performed as virtual adjustments, and the proper positioning of the part could be optimized completely by the system according to the invention. Whether to effect virtual adjustment and the manner in which such virtual adjustment is carried out can be pre-programmed.

If it is necessary and desirable to effect a virtual adjustment (YES in step S108), the virtual adjustments are effected in step S109, and in step S110, the adjusted values are displayed, and any remaining values out of tolerance are highlighted. The process returns to step S108 to determine if still another virtual adjustment is necessary. If the virtually adjusted values such as the distinguished axial values, are within tolerance, no further virtual adjustment is necessary (NO is step S108), and it is determined in step S111 whether a manual adjustment should be performed. In this context, a manual adjustment will be required after a successful or partially successful virtual adjustment to first physically effect the virtual adjustment so that it becomes an actual adjustment, and then finalize the part position. Of course, manual adjustment would also be necessary in the event that virtual adjustment is not desired and one or more actual clearance values are out of tolerance. After a manual adjustment is performed, the process returns to step S104. If no manual adjustment is necessary (NO in step S111), the process is completed.

Figure 3:
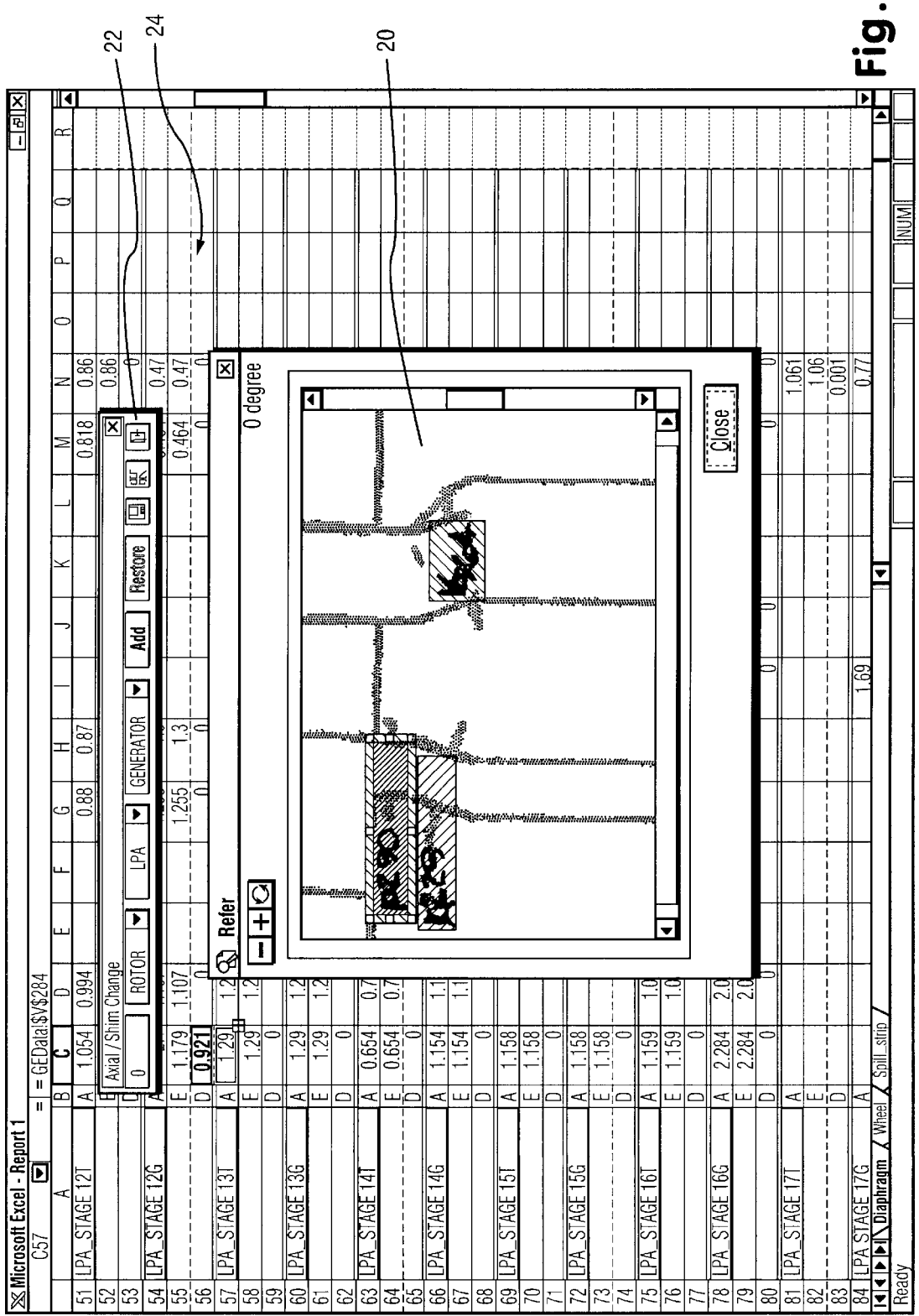
FIG. 3 is a sample screen showing the scanned clearance measurement drawing, an adjustment entry, and the spreadsheet data.

FIG. 3 is a sample screen showing the scanned clearance measurement drawing 20 and an adjustment entry 22 in the foreground, and the spreadsheet data 24 in the background.

The scanned clearance measurement drawing 20 may include an indication of the part location, the design clearance, and the tolerance as well as the actual clearance and an indication of whether the actual clearance value is out of tolerance. The adjustment entry 22 is an exemplary entry for a thrust bearing in a turbine rotor. A shim change simulates an axial movement at the thrust bearing shims and virtually adjusts all the affected rotor clearances axially. Virtual changes simulate that thrust bearing shim adjustment. On the spreadsheet data, "A" represents the actual clearance measurement value, "E" represents the expected or design clearance, and "D" represents a difference between actual values and expected values. If the difference is out of tolerance, the value is highlighted on the spreadsheet (and preferably the clearance measurement drawing) e.g., by displaying in red or the like.

By utilizing the system according to the present invention for analyzing part clearance data for a rotating equipment part, tedious iterations and calculations can be eliminated thereby reducing outage duration and increasing part positioning accuracy. With an electronically scanned clearance measurement drawing, accurate readings facilitate the process, and with the spreadsheet display, out of tolerance values can be easily ascertained and corrected. Moreover, the process can be further streamlined using the virtual adjustment.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

What is claimed is:

1. A method for analyzing equipment clearance data, the method comprising:
   (a) storing design clearance data and tolerance data for a static part;
   (b) measuring actual clearance values for the part; and
   (c) determining whether any of the actual clearance values are out of tolerance, wherein if any actual clearance values are out of tolerance, (c1) indicating actual clearance values that are out of tolerance, (c2) adjusting an installation position of the part, and (c3) repeating step (c).

2. A method according to claim 1, further comprising electronically scanning a design clearance drawing, wherein step (b) is practiced by (b1) designating a measurement area on the design clearance drawing for a next measurement of actual clearance values.

3. A method according to claim 2, wherein step (b1) is practiced by assigning an identification number to the next measurement that identifies a specific equipment location.

4. A method according to claim 1, further comprising displaying the actual clearance values on a spreadsheet, wherein step (c1) is practiced by highlighting actual clearance values that are out of tolerance on the spreadsheet.

5. A method according to claim 1, wherein step (c2) comprises adjusting an axial position of the part.

6. A method according to claim 5, wherein the adjusting step is virtual.

7. A method according to claim 6, further comprising distinguishing between axial readings and radial readings, thereby effecting virtual adjustment by adjusting only axial readings.

8. A method according to claim 7, wherein the adjusting step is practiced by optimizing the axial position of the part, then adjusting a radial position of the part.

9. A method according to claim 1, wherein step (c2) comprises adjusting a radial position of the turbine part.

10. A method according to claim 1, wherein step (c2) comprises adjusting an axial position and a radial position of the part.

11. A method according to claim 1, wherein the part is one of a turbine rotor or a turbine casing.

12. An apparatus for analyzing equipment clearance data, the apparatus comprising:
   a memory storing design clearance data and tolerance data for a static part;
   a measuring apparatus that measures actual clearance values for the part; and
   a processor communicating with the memory and receiving data input from the measuring apparatus, the processor determining whether any of the actual clearance values are out of tolerance, wherein if any actual clearance values are out of tolerance, the processor indicating actual clearance values that are out of tolerance so that an installation position of the part can be adjusted.

13. An apparatus according to claim 12, wherein the processor is configured to effect a virtual adjustment of the part if any actual clearance values are out of tolerance.

14. An apparatus according to claim 12, wherein the part is one of a turbine rotor or a turbine casing.

* * * * *

UNITED STATES PATENT AND TRADEMARK OFFICE
CERTIFICATE OF CORRECTION

PATENT NO. : 6,351,721 B1  Page 1 of 1
DATED : February 26, 2002
INVENTOR(S) : Werner et al.

It is certified that error appears in the above-identified patent and that said Letters Patent is hereby corrected as shown below:

<u>Column 4,</u>
Line 6, delete "(NO is step S108)" and insert -- (NO in step S108) --;
Line 59, delete "the part" and insert -- the static part --;
Line 64, delete "the part" and insert -- the static part --.

<u>Column 5,</u>
Line 12, delete "the part" and insert -- the static part --;
Line 20, delete "the part" and insert -- the static part --;
Line 21, delete "the part" and insert -- the static part --;
Line 23, delete "the" and insert -- a --;
Line 26, delete "the part" and insert -- the static part --.

<u>Column 6,</u>
Line 1, delete "the part" and insert -- the static part --;
Line 9, delete "the part" and insert -- the static part --;
Line 17, delete "the part" and insert -- the static part --;
Line 23, delete "the part" and insert -- the static part --.

Signed and Sealed this

Twenty-eighth Day of May, 2002

Attest:

Attesting Officer

JAMES E. ROGAN
Director of the United States Patent and Trademark Office